United States Patent [19]

Ting

[11] Patent Number: 4,630,414
[45] Date of Patent: Dec. 23, 1986

[54] CELLULAR STEEL DECKING

[76] Inventor: Raymond M. L. Ting, 318 Holiday Dr., Pittsburgh, Pa. 15237

[21] Appl. No.: 778,812

[22] Filed: Jun. 7, 1985

Related U.S. Application Data

[63] Continuation-in-part of Ser. No. 559,252, Dec. 8, 1983, abandoned, which is a continuation of Ser. No. 340,869, Jan. 20, 1982, abandoned, which is a continuation-in-part of Ser. No. 188,085, Sep. 17, 1980, abandoned.

[51] Int. Cl.⁴ .............................................. E04B 5/48
[52] U.S. Cl. ........................................ 52/220; 52/336
[58] Field of Search ............... 52/220, 221, 336, 630; 174/48, 49

[56] References Cited

U.S. PATENT DOCUMENTS

| | | | |
|---|---|---|---|
| 2,090,483 | 8/1937 | Mendez | 52/336 |
| 2,912,848 | 11/1959 | Lee | 52/221 |
| 3,303,264 | 2/1967 | Saul | 174/48 |
| 3,592,956 | 7/1971 | Fork | 52/221 |
| 3,793,793 | 2/1974 | Dobbins | 52/221 |
| 3,812,636 | 5/1974 | Albrecht | 52/336 |
| 3,820,295 | 6/1974 | Folley | 52/630 |
| 3,851,674 | 12/1974 | Fork | 52/221 |
| 3,886,702 | 6/1975 | Fork | 52/221 |
| 3,956,864 | 5/1976 | Fung | 52/414 |

FOREIGN PATENT DOCUMENTS

| | | | |
|---|---|---|---|
| 3506 | 8/1979 | European Pat. Off. | 174/48 |
| 2600662 | 7/1977 | Fed. Rep. of Germany | 52/336 |
| 1176824 | 4/1959 | France . | |
| 787565 | 12/1957 | United Kingdom | 52/221 |

OTHER PUBLICATIONS

Airtherm Brochure, Catalog 225, by Airtherm Manufacturing Company, St. Louis, MO.
Wireway 3 Product Manual by E. G. Smith Construction Products, Inc. and related Wireway 3 Brochure.
Spray Craft-*Fireproof Acoustical Correction Thermal Insulation*, Sweets Catalog 7.14/50, 1979.

Primary Examiner—Henry E. Raduazo
Attorney, Agent, or Firm—Robert D. Yeager; George D. Dickos

[57] ABSTRACT

Cellular steel flooring is provided which includes corrugated steel decking and separately applied cover plates which establish a lengthwise cell in cooperation with a valley and the two connecting sloping sidewalls. The resulting cellular steel decking permits distribution of electrical wiring or ventilation air throughout a building without requiring perforations or penetrations of the crest surfaces or sloping sidewall surfaces of the decking. The resulting wet strength of the cellular steel decking remains undiminished. The exposed corrugated undersurface of the corrugated steel decking provides an improved adhesion surface for subsequently applied fireproofing materials. Special cover plates for noncellular troughs are provided along the locus of transverse electrical trench structures to facilitate the mounting of the electrical trench and to permit strengthening concrete to be applied beneath the electrical trench.

9 Claims, 16 Drawing Figures

CELLULAR STEEL DECKING

CROSS-REFERENCES TO RELATED APPLICATIONS

This application is a continuation-in-part of my co-pending application Ser. No. 559,252, filed Dec. 8, 1983, now abandoned, which is a continuation of U.S. patent application No. 340,869, filed Jan. 20, 1982, now abandoned, which is a continuation-in-part of application Ser. No. 188,085, filed Sept. 17, 1980, now abandoned.

BACKGROUND OF THE INVENTION

1. Field of the Invention

This invention relates to improved corrugated steel decking for use in construction of buildings and more particularly to cellular steel flooring which is employed for electrical distribution systems or air distribution systems in a building.

2. Description of the Prior Art

Corrugated steel decking has been employed as a construction material in highrise buildings for many years. The corrugated steel decking is secured to a building framework and is covered with wet concrete which is allowed to harden. The hardened concrete becomes the walking surface for the floors of the resulting buldings. Usually the corrugated steel decking is equipped with indentations or embossments which improve the mechanical bond between the decking and the hardened concrete whereby the concrete and decking cooperate compositely to improve the load-carrying capability of the resulting building floor when compared to the load-carrying ability of the decking itself or of the concrete itself. The strength of the corrugated steel decking must be considered at two different stages of its useful life. Firstly, during the construction stages of the building when the corrugated steel decking is secured to the building framework and before concrete has hardened in engagement with the decking, the corrugated steel decking must have sufficient strength to support its own weight, the weight of typical construction traffic (workmen, construction tools, concrete buggies). Also, after the concrete has been poured, the corrugated steel decking must sustain the parasitic load of the wet concrete which makes no contribution to the load-carrying capability of the resulting floor until it has become hardened. This first strength consideration is known as the wet strength of the steel decking. Secondly, the corrugated steel decking must cooperate compositely with the hardened concrete whereby the load-carrying capability of the composite flooring exceeds the load-carrying capability of the corrugatd steel decking alone. This second strength consideration is known as the composite strength of the steel decking.

Cellular corrugated steel decking has been employed for more than 40 years to function not only as a floor-forming member of a building but also as an electrical distribution system or an air distribution system for the resulting building. The cellular floor typically has been manufactured by combining a flat steel sheet with a corrugated steel sheet whereby individual enclosed lengthwise cells are formed between each corrugation of the corrugated steel decking and the flat sheet. Many permutations of flat sheets and corrugated steel decking are known in the art. Permutations of two corrugated steel decking sections secured together in alignment also have been employed. There are cellular steel decking installations which employ conventional cellular steel decking along with a separate cover plate which encloses a valley between adjacent cells to provide supplemental electrical distribution capacity for the resulting steel flooring, e.g., Fork, U.S. Pat. No. 3,592,956.

The cellular steel flooring of the prior art predominantly employed a flat bottom steel sheet and a corrugated upper steel sheet to define wire-carrying passageways or cells. The principal shortcoming of this construction is that the crest surfaces of the corrugated decking or the sloping web surfaces of the corrugated decking must be penetrated in order to provide wiring access into or out of the individual cells. Such penetrations of the corrugated decking reduce the load-carrying ability of the decking, primarily the wet strength of the decking.

A further shortcoming of prior art cellular steel flooring products is that the access openings or penetrations in the crest surfaces are relatively small and hence present difficulties to workmen who are attempting to introduce wiring into the cells or to extract wiring from the cells.

A still further shortcoming of the cellular steel flooring installations arises from the requirement that the undersurfaces of such decking be covered with an appropriate fireproofing substance. The flat bottom surface of conventional cellular steel decking resists reliable adhesion of typical fireproofing materials. The fireproofing materials adhere more reliably to corrugated surfaces rather than to wide horizontal flat surfaces.

A still further shortcoming of conventional cellular steel decking is the expense of shipment resulting from the fact that cellular steel decking cannot be nested for transportation but instead must be stacked section-by-section with a significant volume of included air space.

When cellular steel decking has been employed for distributing air throughout a building, continuous welding techniques were employed to assure that the resulting cells were airtight. The expense of such continuous welding assemblies has been a significant factor in the lack of commercial success of cellular steel decking for air distribution.

SUMMARY OF THE INVENTION

According to the present invention, cellular steel flooring is produced at the job site by delivering corrugated steel decking which can be nested during storage and shipment to the job site and by providing appropriate cover strips which cover at least one trough in the corrugated decking to create an enclosed cell. The cover strip can be provided in one continuous lengthwise piece or in multiple pieces as required. The cover strip can be assembled with the corrugated steel decking at the job site before the decking is installed or after the decking is installed. The cover strip can be tack welded to the decking if desired or secured and electrically grounded by means of mechanical fasteners.

The resulting cell is wider at the top than at the bottom and hence provides a much larger area for workmen to use when introducing wiring into a cell or extracting wiring from a cell.

Most importantly, however, the use of the present cellular steel decking avoids the need to penetrate the steel decking for access and thereby avoids the reduction in load-carrying ability of the cellular steel flooring when compared with the conventional cellular steel decking of the prior art.

The present cellular steel decking is more economical in the use of metal in its formation than conventional cellular steel decking. The present cellular steel decking accepts underside fireproofing more readily than conventional cellular steel decking because the entire corrugated undersurface of the corrugated steel decking is exposed. Wide flat horizontal areas of steel are not presented.

When the present cellular steel decking is employed for air distribution systems, the need for expensive continuous welding techniques is eliminated inasmuch as inexpensive caulking materials may be employed to form airtight joints in those cells which are intended for air distribution.

The present cellular steel decking is formed from corrugated steel decking and cover strips. The steel decking includes re-entrant in the sloping side wall adjacent to the crest of the decking. The cover strip has its side edges engaged in confronting grooves and is thus secured below the level of the crests. The cells of the resulting cellular floor decking are defined by confronting side walls and the included valley of the corrugated steel decking and by the cover strip. Access to the interior of the cells is accomplished by proving a separation between cover strips or by providing a hole in a cover strip.

A still further advantage of the present invention is the simplicity of installing crossover electrical distribution trenches on top of the cellular steel decking as will become apparent from the following description.

DESCRIPTION OF THE PREFERRED EMBODIMENTS

The Prior Art

Figure 1:
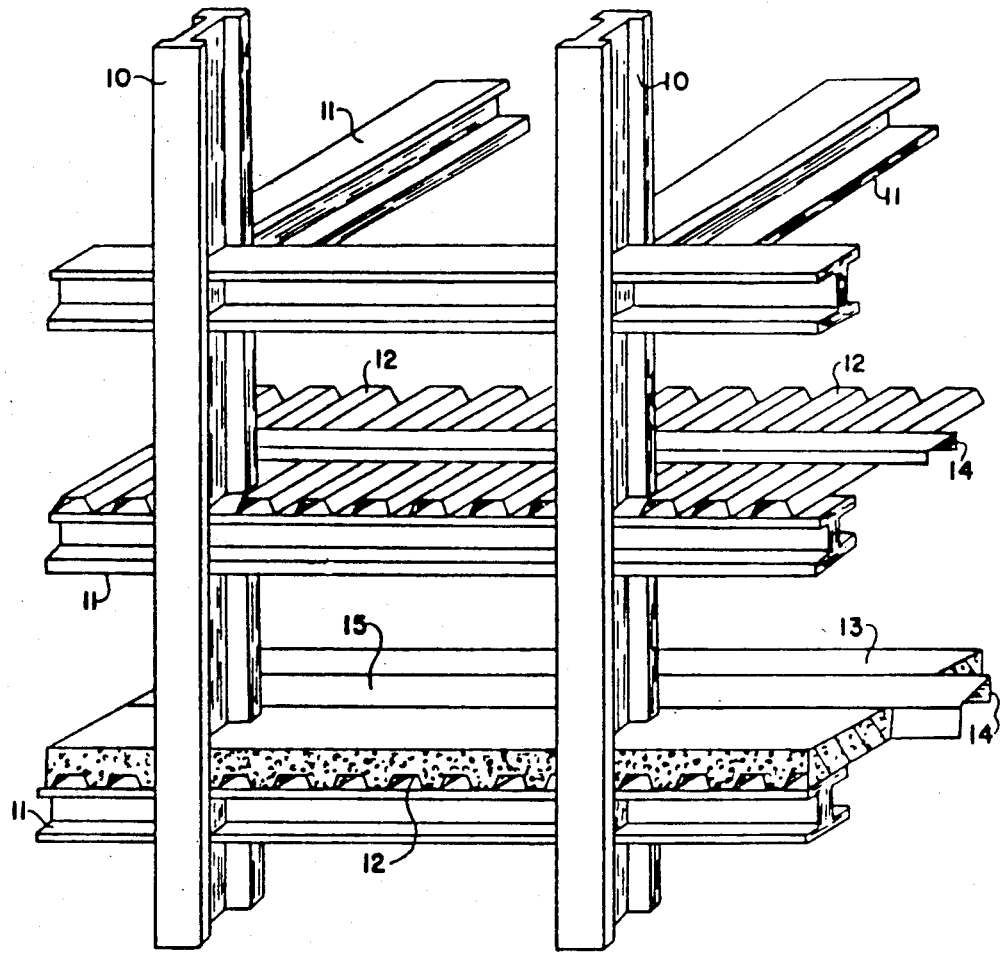
FIG. 1 is a perspective illustration of a typical modern highrise building showing the general manner in which cellular steel decking is employed.

FIG. 1 illustrates a typical modern highrise building which includes vertical columns 10 and horizontal beams or girders 11. Cellular steel decking 12 is secured to the horizontal beams or girders 11, usually by welding. After all of the cellular decking 12 has been assembled on a particular floor, a covering concrete layer 13 is applied.

In an electrified floor installation, a transverse electrical trench 14 extends across the top of the cellular steel decking 12 and is subsequently embedded in place by the concrete layer 13. The cover plate 15 of the electrical trench 14 can be removed to provide access into the trench and into the cells of the cellular steel decking.

Figure 2:
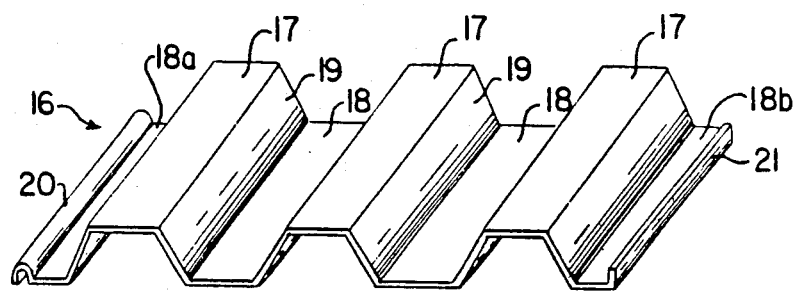
FIG. 2 is a perspective illustration of a typical corrugated steel decking section according to the prior art.
Figure 3:
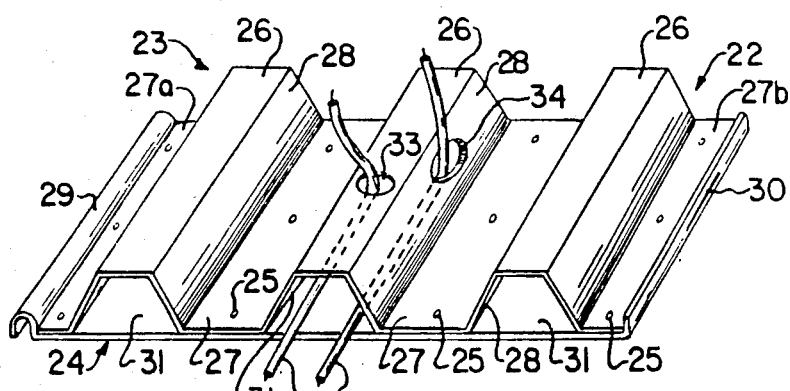
FIG. 3 is a perspective illustration of a typical cellular steel decking section according to the prior art.

The terminology of the cellular steel decking can be illustrated in FIGS. 2 and 3. FIG. 2 shows a typical corrugated steel decking section 16 having alternating horizontal crests 17, intervening valleys 18 and sloping sidewalls 19 which diverge from each crest to the adjacent valleys. The lateral valleys 18a, 18b have marginal connecting means such as a groove 20 and a tongue 21, respectively. The decking sections 16 are assembled side-by-side with the tongue 21 of one section engaged with the groove 20 of the adjoining section. Each pair of confronting sloping sidewalls 19 and the included valley 18 define a lengthwise trough of the decking section. Other types of marginal connections are known in the art and may be used with the present invention.

In FIG. 3 a typical cellular steel decking section 22 is formed from a corrugated decking section 23 and an essentially flat section 24 which are secured together by means of spaced spot welds 25. The corrugated section 23 includes crest surfaces 26, valley surfaces 27, including lateral valley surfaces 27A, 27B, and sloping sidewalls 28. A marginal connecting groove 29 and tongue 30 are provided either in the flat section 24 (as shown) or in the lateral valleys 27A, 27B.

The cellular steel flooring section 22 includes multiple enclosed cells 31 through which electrical wiring 32 may be distributed throughout a building. Typically, the electrical wiring 32 is withdrawn from a cell 31 through an aperture 33 in the crest surface 26 or through an aperture 34 in a sidewall surface 28. When a crest aperture 33 is employed, the opening is relatively small because the width of the crest surface 26 is relatively small. This presents difficulties to workmen attempting to introduce wiring 32 into the cell 31 or to extract wiring 32 from the cell 31.

The sidewall aperture 34 typically can be made larger in cross-sectional area than the crest aperture 32. Both the crest aperture 33 and the sidewall aperture 34 cause a reduction in the wet strength of the cellular steel decking section 22.

The relatively wide, essentially flat undersurface of the flat section 24 is difficult to fireproof because the fireproofing material resists reliable adhesion to the wide horizontal flat surface.

The Present Invention

Figure 4:
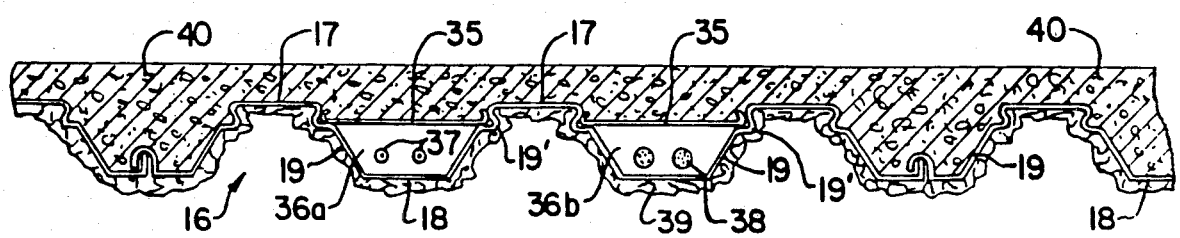
FIG. 4 is a cross-sectional view through a typical cellular steel decking installation employing the present invention.

One embodiment of the present improved cellular decking is illustrated in FIG. 4 wherein a typical corrugated steel decking section 16 is provided with cover plates 35 spanning the distance between adjacent sloping sidewalls 19 and forming enclosed cells 36. It will be observed that the cells 36 are formed by the undersurface of the cover plate 35, the covered valley 18 and the included sloping sidewalls 19.

Power wiring 37 may be provided in one cell 36A. Communications cables 38 may be provided in a different cell 36B.

The cover plates 35 may extend the entire length of the corrugated decking section 16 as a single piece which is secured to the corrugated decking section 16 by engagement of its side edges in lengthwise grooves 19' at the upper edge of each sloping sidewall 19. Any number of openings may be provided in the cover plates 35 to permit introduction of wiring into the cells 36 or withdrawal of wiring from the cells 36. The access openings are not provided in the corrugated decking section 36 which remains imperforate and has its strength undiminished. Instead, the access openings are provided in or between the cover plates 35. It will be further observed that the width of the cover plates 35 is greater than the width of the crest surfaces 17 whereby larger holes may be provided for wiring entry and withdrawal. A preferred form of wiring access opening is simply a space between sections of cover plate 35.

It will further be observed from FIG. 4 that the entire corrugated undersurface of the decking section 16 remains exposed whereby sprayed-on fireproofing material 39 will adhere reliably.

A covering concrete layer 40 is applied on top of the assembled cellular decking sections of FIG. 4. The crest surfaces 17, sloping sidewalls 19 and valley surfaces 18 may be provided with appropriate indentations or embossments for improving the composite coaction of the concrete layer 40 with the steel decking. While the indentations or embossments appearing on the walls of the cells 36 will not be effective in establishing any composite coaction between the decking and the concrete, nevertheless the exposed crest surfaces 17 and the lateral valley surfaces and lateral sloping walls will provide adequate bonding area for achieving effective composite coaction between the decking and the concrete layer 40. It has been observed that most corrugated flooring products of the prior art have a load-bearing capability in composite strength greatly exceeding that which is required in modern buildings. The limiting strength factor in most cellular steel flooring installations is the wet strength of the cellular steel sections. According to this invention, the wet strength of the decking sections is unimpaired and the composite strength of the resulting floor, while diminished from that heretofore available, nevertheless exceeds the typical design requirements.

The cover strips 35 are disposed below the level of the crests 17 of the corrugated steel decking 16. The structure is thus protected from damage during construction phase of the building from movement of concrete buggies, workmen, tools or other construction traffic. Engaging the side edges of the cover strips 35 in the confronting grooves 19' simplifies sealing the cells 36 to retard entry of wet concrete into the cells 36 during the construction phase.

Figure 5:
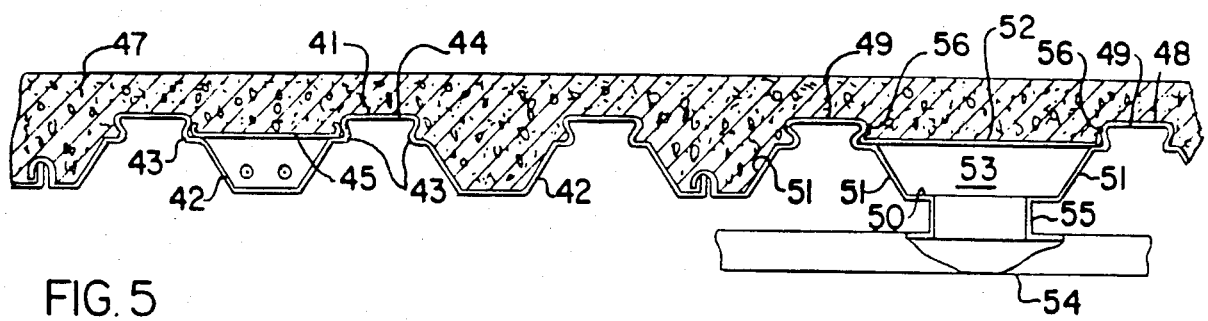
FIG. 5 is a cross-sectional view showing a cellular decking section of the present invention for use as an electrical distribution system and as an air distribution system.

Referring to FIG. 5 there is illustrated a cellular flooring installation according to this invention for distributing ventilation air throughout the structural floor of a building. A preferred form of corrugated steel decking section 41 is illustrated in FIG. 5. The sloping sidewalls 42 have a reentrant groove 43 beneath the crest surfaces 44. The decking section having this design is more fully described in my copending U.S. patent application Ser. No. 153,260, filed May 27, 1980, abandoned and refiled as continuation-in-part Application Ser. No. 317,587 on Nov. 3, 1981. The reentrant grooves 43 provide a convenient mounting for a cover plate 45 which spans the distance between adjacent grooves 43. The cover plate 45 is more clearly illustrated in FIG. 7 wherein an essentially flat surface is provided with curved side edge flanges 46 which can engage the grooves 43. A close fit is not required inasmuch as the entire structure ultimately will be covered with a concrete layer 47 which will effectively bond the elements rigidly in position.

Another embodiment of the decking section 48 is provided having only two crests 49 and a single included valley surface 50. The confronting sloping sidewalls 51 and the included valley surface 50 are covered by a wide cover plate 52 to define an air distribution cell 53 which may be connected to an air manifold conduit 54 by an appropriate connector 55. It will be observed that the connection between the sides of the cover plate 52 and the sloping sidewalls 51 can be sealed by an appropriate caulking bead 56 which avoids the requirement for continuous welding of the air cells. The cover plate 52 and caulking beads 56 ultimately will be covered by the concrete layer 47 and air leakage from the air cell 53 thus will be prevented.

The opening in the valley 50 for receiving inlet air through the connector 55 will not adversely reduce the load-carrying capacity of the cellular steel decking section 48 because the valley surfaces are normally tension members which are not the failure element of composite steel decking. Instead, failure of steel decking sections normally occurs as a result of crest surface buckling or sloping sidewall collapse.

Figure 6:
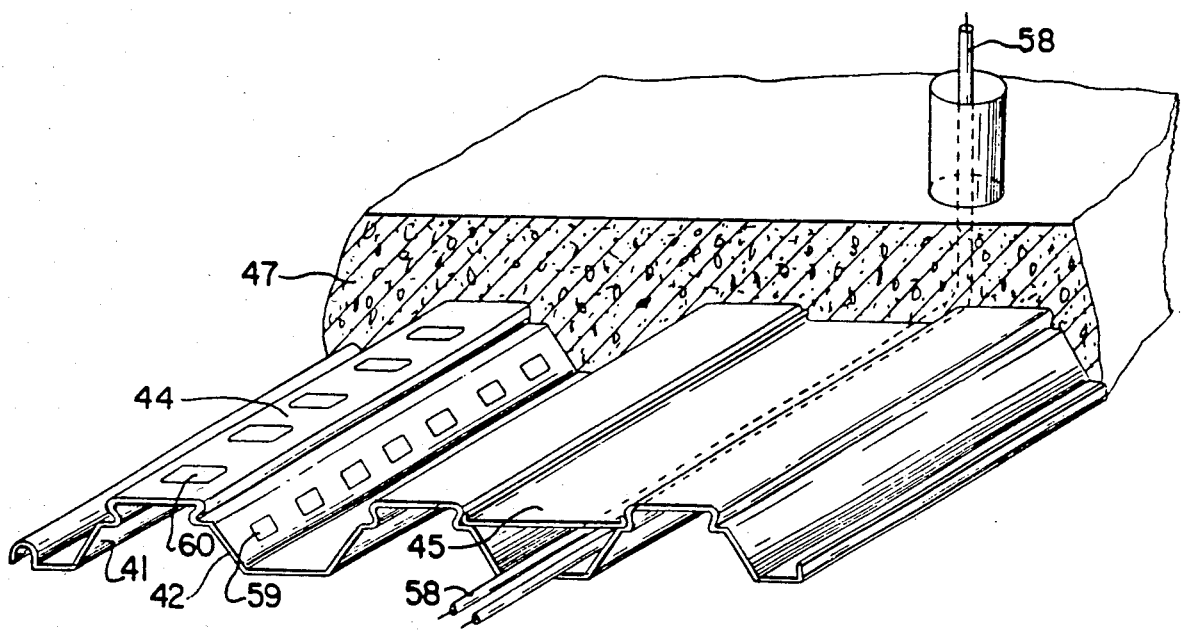
FIG. 6 is a perspective view, partly broken away, illustrating a preferred embodiment of the present cellular steel decking.

FIG. 6 illustrates a preferred embodiment of the present invention including the corrugated decking section 41 as described in my copending U.S. patent application Ser. No. 153,260 (now U.S. patent application No. 317,587 and U.S. Pat. No. 4,453,364) aforesaid. The cover plate 45 has an appropriate opening 57 for delivering wiring 58 upwardly through a concrete layer 47 for use in the building. Indentations or embossments 59 may be provided on the sloping sidewalls 42. Indentations or embossments 60 may be provided in the crest surfaces 44.

Figure 8:
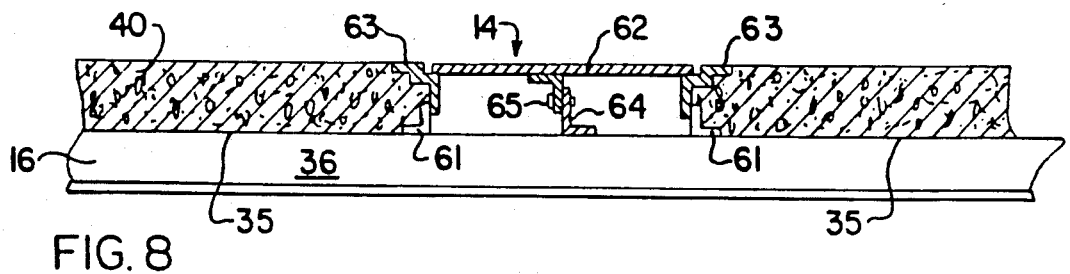
FIG. 8 is a cross-sectional view of a cellular steel decking installation of this invention taken through a crossover electrical trench.

The provision of crossover electrical trenches with the present invention is simplified as will be illustrated in FIGS. 8, 9, 10, 11. A typical electrical crossover trench 14 can be provided above the decking 16 to provide communication with at least one of the wire-carrying cells 36 as shown in FIG. 8. A cover plate 35 forms the top of the cell 36. The cover plate 35 ends at a rail or bracket 61 which defines one side of the electrical trench 14. The electrical trench 14 includes a cover plate 62 and two side rails 63. The side rails 63 connect to the rail's brackets 61 in such fashion that they may be raised or lowered as required to provide an appropriate thickness of the subsequently poured concrete layer 40.

The precise height adjustment means for the side rails 63 forms no part of the present invention. The side rails 63 include a shoulder for receiving the sides of the cover plate 62 and a screed surface which is essentially coplanar with the upper surface of the cover plate 62.

Figure 9:
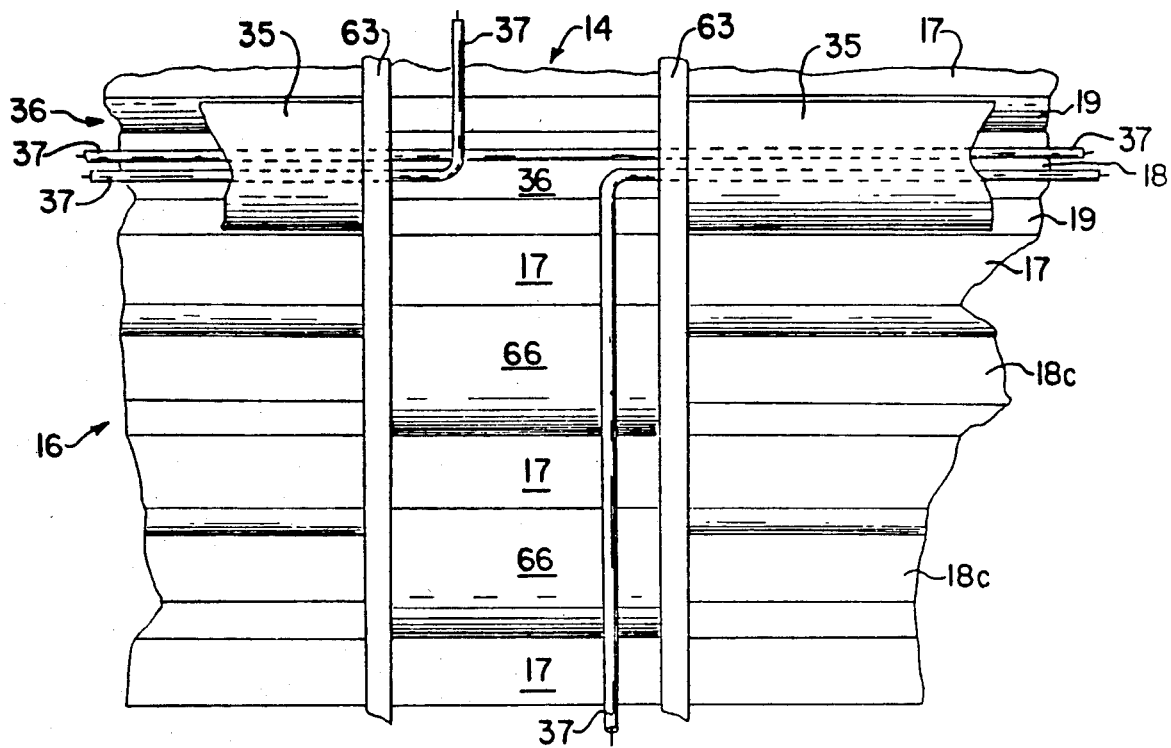
FIG. 9 is a plan view of the electrical trench of FIG. 8.

An intermediate separator rail 64 is connected together by fasteners 65. The upper surface of the rail 64 supports the underside of the cover plate 62. The bottom surface of the rail 64 is fastened to the crests of the steel decking sections 16. The separator rail 64 divides the trench 14 into two side-by-side passageways. Referring to FIG. 9, it will be observed that the cover plate 35 spans the distance from the crest surfaces 17 and defines a wire-carrying cell 36 along with the sloping sidewalls 19 and the included valley 18. It will be observed that there is no cover plate above the decking 16 between the side rails 63. Hence the electrical wiring 37 is exposed to view and manipulation when the trench cover plate 62 is removed. The wiring 37 may extend along the length of the electrical trench 14 above the crest surfaces 17.

Figure 10:
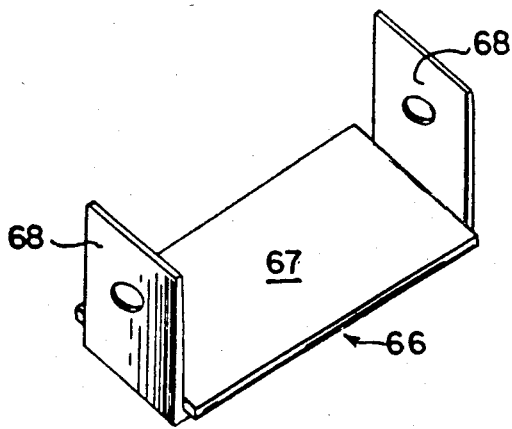
FIG. 10 is a perspective illustration of a cover plate for use in locating and positioning an electrical trench in the present cellular steel flooring.
Figure 11:
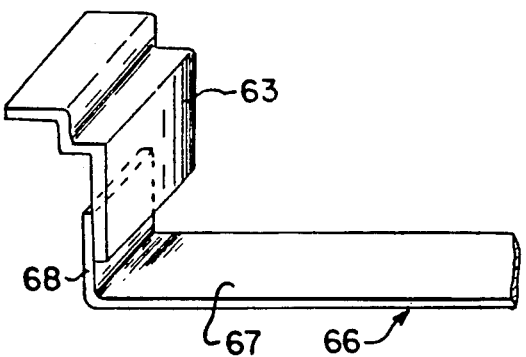
FIG. 11 is a perspective illustration showing the manner in which the cover plate of FIG. 10 engages an electrical trench side rail.

For those valleys 18c which do not function as cells, cover members 66 are provided as shown in FIG. 10 with a flat portion 67 and a pair of ears 68 extending perpendicularly from the flat surface 67. The cover members 66 are provided between the side rails 63 above those valleys 18c which are not employed as elements of cells. The cover members 66 permit concrete to flow beneath the electrical trench 14 and prevent concrete from flowing upwardly into the cross-sectional area of the electrical trench 14. The upstanding ears 68, as shown in FIG. 11, provide a predetermined spacing for the side rails 63 which form the electrical trench and greatly facilitate the placement of the electrical trench 14. Heretofore, barrier members for electrical trench installations have been complicated multicomponent structures which precluded entry of concrete into the interior of the trench 14 between the side rails 63. The present invention permits concrete to fill the unused troughs beneath the electrical trench and thus avoids excessive strength losses in the flooring in the region of the electrical trench.

General Comments

Figure 7:
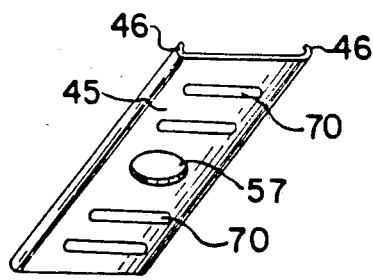
FIG. 7 is a perspective view of a typical cover plate for use in the preferred embodiment of FIG. 6.
Figure 12:
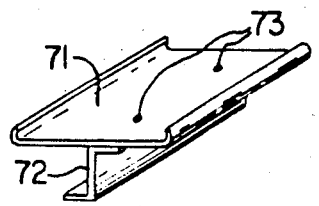
FIG. 12 is a perspective view of a preferred cover strip having upturned side edges.

The cover plates employed to form the cells of the present cellular decking may be essentially flat as shown in FIG. 4; may be profiled as shown in FIG. 7 and FIG. 12; or may take other shapes to accommodate special conditions.

The cover plates may be secured to the corrugated decking sections at the construction site of the building by sliding cover plates of FIG. 7 along the length of the decking sections or by pressing the cover plates into engagement with the reentrant grooves of the decking sections. The cover plates may be a single lengthwise strip element corresponding in length to the decking section or may be multiple pieces. By providing spaces between multiple pieces, a convenient and inexpensive access into the interior of the cells can be provided.

It will be observed that the decking sections are nestable and can be nested in a small volume for transportation and storage.

The essential improvement of the present invention is the provision of cellular steel decking which does not require penetration of the crests or sloping sidewalls of the corrugated decking for activation of the electrical distribution functions. The present invention is particularly useful with corrugated steel decking sections of the type described in my copending U.S. patent application Ser. No. 153,260 (now U.S. patent application No. 317,587 and U.S. Pat. No. 4,453,364) aforesaid which provides for increased wet strength of the decking sections as a result of reentrant beads adjacent to the crest surfaces of the decking sections. The reentrant beads serve the additional function in the present invention of providing a useful and convenient mounting means for cover plates.

The cover plates of the present invention may be equipped with appropriate stiffening beads 70 as illustrated in FIG. 7. By having the side edges of the cover plates turned upwardly, the cover plates do not interfere with excellent composite action between concrete and the corrugated steel decking.

Figure 13:
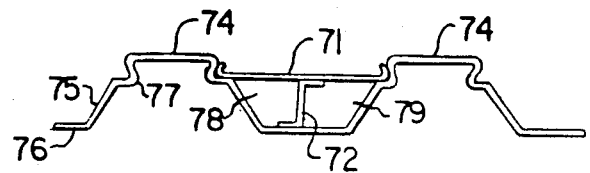
FIG. 13 is a perspective view of the cover strip of FIG. 12 with a vertical separator strip served thereto.

In a further embodiment of cover plate design shown in FIG. 12, a cover plate 71 is connected to a Z-shaped strip 72 by means of welds 73. The Z-shaped strip 72 provides central support along the entire length of the cover plate 71 and also serves to divide the interior of a wiring passageway into two parallel passageways. This can be illustrated in FIG. 13 where a corrugated decking section 74 has sloping sidewalls 75 and an intervening valley 76. The cover plate element of FIG. 11 is secured by having its side edges engaged in grooves 77 in the sloping sidewall 75. The Z-shaped strip 72 divides the resulting wire passageway into two separate passageways 78, 79.

Figure 14:
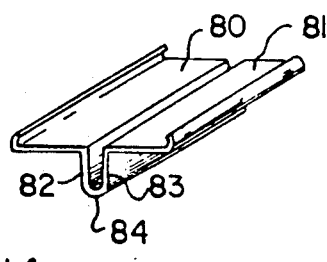
FIG. 14 is a perspective view of a further embodiment of the cover strip wherein a vertical separator strip is formed integrally therewith.
Figure 15:
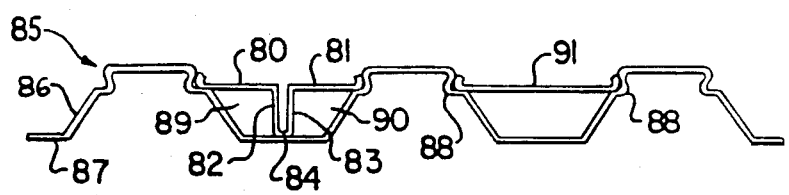
FIG. 15 is a fragmentary cross-section view of a preferred embodiment of the present cellular steel flor with the cover strip of FIG. 14.
Figure 16:
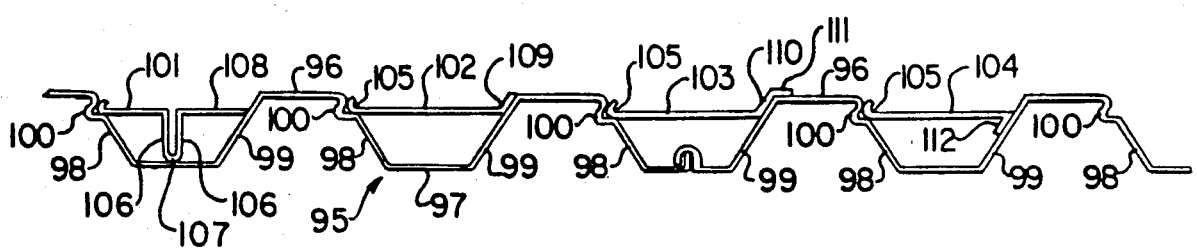
FIG. 16 is a fragmentary cross-section view of an alternative embodiment of the present cellular steel floor with the cover strip of FIG. 13.

A still further embodiment of the cover plate is illustrated in FIG. 14. A single piece of sheet metal, for example, 16 to 20 gauge steel, is formed with two essentially coplaner surfaces 80, 81 and depending wall surfaces 82, 83 connected by a fold 84. This cover strip of FIG. 14 can be employed as shown in FIG. 15. A decking section 85 has sloping sidewalls 86 and an intervening valley 87. The sloping sidewalls 86 have grooves 88 near their upper ends for receiving the side edges of the cover plate of FIG. 14. The depending walls 82, 83 function to separate the resulting electrical wiring passageway into a pair of parallel passageways 89, 90. The construction also provides an outward thrust for the outer edges of the surfaces 80, 81 against the groove 88 to retain the cover plate in position. Some concrete will enter into the space between the depending walls 82, 83 to provide further rigidity to the construction.

FIG. 15 also illustrates an essentially flat cover plate 91 having upwardly curled side edges engaged within grooves 88. It will be observed that the grooves 88 provide a positive anchoring for the subsequently applied concrete to achieve adequate composite action between the concrete and the steel decking.

A further alternative embodiment of the present invention can be assembled by employing corrugated steel decking having a groove in only one of the confronting sloping sidewalls as shown in FIG. 15. Therein the decking 95 includes crests 96, valleys 97, sloping sidewalls 98, 99. The sloping sidewalls 98 are provided with a groove 100 whereas the confronting sloping grooves 99 do not have a corresponding groove. In this embodiment, wiring passageways can be formed by using cover plates 101, 102, 103, 104, all of which have an upwardly curved edge 105. Cover plate 101 has a pair of depending surfaces 106 joined at a fold 107 and has a free end 108. The cover plate 102 has an upward flange 109 which may be secured to the sloping sidewall 99 in any desirable fashion, e.g., by means of a threaded fastener, a weld or an adhesive.

The cover plate 103 has an upwardly turned flange 110 and a continuous or discontinuous tongue 111 resting upon the crest surface 96. The cover plate 104 has a downturned flange 112 resting upon the sloping sidewall 99.

While none of the embodiments shown in FIG. 15 is as desirable as the embodiments of this invention, nevertheless they do represent a method for exploiting the present invention, i.e., providing a cover plate in a groove whereby composite action between a covering concrete layer and a corrugated steel decking section can be achieved and useful electrical wiring passageways can be provided in a building floor without requiring penetration of the corrugated steel decking.

I claim:

1. In a cellular flooring for a composite floor of a building comprising nestable corrugated steel decking stations connected in side-by-side arrangement, each of said sections comprising plural essentially imperforate horizontal crests and plural horizontal valleys connected by essentially imperforate generally sloping sidewalls whereby each pair of confronting sidewalls and the included one of said valleys defines a lengthwise trough, a covering layer of concrete compositively engaged with said decking sections to form said composite floor;
the improvement comprising;
cover means comprising one or more strip elements secured to said decking section above the said included valley and below the said crests whereby an enclosed lengthwise cell is defined by said trough and said strip elements;
the said sloping sidewalls diverge from each said crest to the adjacent valleys and a reentrant groove is provided in each of said sloping sidewalls adjacent to the said crest; and the said strip elements are retained in position by engagement in a confronting pair of said grooves;
said covering layer of concrete extending into said reentrant grooves to form a composite bond above the said included valley;
at least one opening in said cover means defining a passageway which opens into said lengthwise cell.

2. The improvement of claim 1 wherein the said cover means have upturned side edges which are secured along their side edges in the said grooves of said confronting sloping sidewalls.

3. The improvement of claim 1 wherein a fireproofing coating is applied to the undersurface of each of said crests, said valleys and said sloping sidewalls.

4. The improvement of claim 1 wherein the said passageway receives wires or conductors.

5. The improvement of claim 4 wherein an electrical trench spans said decking sections and includes a cover plate and side rails, said side rails being connected to said decking sections; said trench further having cover members between the said side rails above those valleys of said decking sections which do not define the said lengthwise cells.

6. The improvement of claim 1 wherein said cover means comprises one or more strip elements, each having a top surface and a central, depending wall member, the sides of the said top surface being secured to said decking section and the bottom of said depending wall member being adjacent to the central portion of the said included valley whereby the said wall member divides the said enclosed lengthwise cell into two side-by-side enclosed lengthwise cells.

7. The improvement of claim 6 wherein the said cover means is formed from one or more strips, each having a central fold which is adjacent to the said central portion of the said included valley, two vertical surfaces extending upwardly from said central fold and comprising the said wall member, a generally horizontal surface extending outwardly from the top of each said vertical surfaces and engaged at their outer edges with confronting ones of the said sloping side walls.

8. The improvement of claim 1 wherein the said strip elements are presented below the level of the said crests.

9. In a cellular flooring for a composite floor of a building comprising nestable corrugated steel decking sections connected in side-by-side arrangement, each of said sections comprising plural essentially imperforate horizontal crests and plural horizontal valleys connected by essentially imperforate generally sloping sidewalls whereby each pair of confronting sidewalls and the included one of said valleys defines a lengthwise trough, a covering layer of concrete compositively engaged with said decking sections to form said composite floor;
the improvement comprising:
cover means comprising one or more strip elements secured to said decking section above the said included valley and below the said crests whereby an enclosed lengthwise cell is defined by said trough and said strip elements;
the said sloping sidewalls diverge from each said crest to the adjacent valleys and a reentrant groove is provided in at least one pair of confronting ones of said sloping sidewalls adjacent to the said crest; and the said strip elements are retained in position at least in part by engagement in a said groove;
said covering layer of concrete extending into said reentrant grooves to form a composite bond above the said included valley;
at least one opening in said cover means defining a passageway which opens into said lengthwise cell.

* * * * *